US008693155B2

(12) United States Patent
Mizui (10) Patent No.: US 8,693,155 B2
(45) Date of Patent: Apr. 8, 2014

(54) CONSTANT VOLTAGE POWER SUPPLY CIRCUIT

(75) Inventor: Keizou Mizui, Daitou (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 340 days.

(21) Appl. No.: 13/269,352

(22) Filed: Oct. 7, 2011

(65) Prior Publication Data

US 2012/0087053 A1    Apr. 12, 2012

(30) Foreign Application Priority Data

Oct. 7, 2010  (JP) ................................. 2010-227676

(51) Int. Cl.
*H02H 7/00*    (2006.01)
(52) U.S. Cl.
USPC ........................................................ 361/93.7
(58) Field of Classification Search
USPC ........................................................ 361/93.7
See application file for complete search history.

(56) References Cited

U.S. PATENT DOCUMENTS

| 5,844,197 | A | * | 12/1998 | Daniel | ..................... | 219/121.57 |
| 6,191,566 | B1 | * | 2/2001 | Petricek et al. | ............... | 323/224 |
| 6,472,856 | B2 | * | 10/2002 | Groom et al. | ................. | 323/284 |
| 7,064,532 | B1 | * | 6/2006 | Suzuki | .......................... | 323/276 |

FOREIGN PATENT DOCUMENTS

JP    8115135 A    5/1996

OTHER PUBLICATIONS

English Patent Abstract of JP 8115135 from esp@cenet, published May 7, 1996, 1 page.

* cited by examiner

*Primary Examiner* — Stephen W Jackson
(74) *Attorney, Agent, or Firm* — Polansky & Associates, P.L.L.C.; Paul J. Polansky (57) ABSTRACT

A constant voltage power supply circuit includes an output voltage dependent over-current protection circuit unit and a drooping over-current protection circuit unit. The output voltage dependent over-current protection circuit unit reduces, when an output current which is output from an output terminal of an output control transistor exceeds a first set value which is determined in advance, the output current from the first set value in a manner dependent on a reduction of an output voltage which is output from the output terminal. The drooping over-current protection circuit unit detects, with an external resistor, the output current which is output from the output terminal of the output control transistor, and reduces, when the detected output current exceeds a second set value which is determined in advance and which has a lower value than the first set value, the output voltage while maintaining the output current at the second set value.

4 Claims, 5 Drawing Sheets

CONSTANT VOLTAGE POWER SUPPLY CIRCUIT

CROSS REFERENCE TO RELATED APPLICATIONS

This application claim priority to Japanese Patent Application No. 2010-227676, filed on Oct. 7, 2010, the entire content of which is incorporated herein by reference.

BACKGROUND OF INVENTION

1. Field of the Invention

One or more embodiments of the invention relate to a constant voltage power supply circuit, and in particular to a constant voltage power supply circuit having an over-current protection function.

2. Background Art

As means for over-current protection of a constant voltage power supply circuit forming a series regulator, there are known a current limiting circuit which prevents an output current from becoming a current value greater than or equal to a predetermined current value, and an over-current protection circuit which limits an output current when output is short-circuited.

For example, JP H8-115135 A discloses a direct current stabilizing power supply circuit in which an input voltage is input to a series circuit of an over-current detecting resistor and a series transistor, stabilized, and output as a stabilized voltage to a load, wherein an over-current is detected by the over-current detecting resistor, and there is employed a drooping characteristic in which, when the output current exceeds a limit, the output voltage is gradually reduced while the current is set at the limit current, by an operation of a controlling transistor. In the drooping characteristic, a voltage which is approximately equal to an input voltage is applied between a drain and a source of the series transistor during output short-circuiting, a loss calculated as a product of this voltage and the output current becomes high, and the load to the series transistor becomes high. Therefore, this reference discloses the use of a fold-back type drooping characteristic or a modified fold-back type drooping characteristic where the output current is reduced stepwise depending on the output voltage, in place of the drooping characteristic.

Although the over-current protection function can be integrated in the constant voltage power supply circuit, due to variation in the built-in elements in the IC, the current values for the limitation of the over-current may vary. In some usages of the constant voltage power supply circuit, it may be desired that the limit current value for the over-current be strictly controlled. On the other hand, there are other usages where the limit current value may not need to be controlled so strictly.

As described above, an allowance range of the limit current value for the over-current differs depending on the usage. In order to handle these respective cases, there must be provided constant voltage power supply circuits having different specifications for the over-current protection function depending on the usages.

SUMMARY OF INVENTION

An advantage of one or more embodiments of the present invention is provision of a constant voltage power supply circuit which can handle a plurality of specifications having different allowance ranges of the limit current value for the over-current.

According to one or more aspects of the present invention, there is provided a constant voltage power supply circuit comprising an output voltage dependent over-current protection circuit unit which reduces, when an output current which is output from an output terminal of an output control transistor exceeds a first set value which is determined in advance, the output current from the first set value in a manner dependent on a reduction of an output voltage which is output from the output terminal, and a drooping over-current protection circuit unit which detects, with an external resistor, the output current which is output from the output terminal of the output control transistor, and reduces, when the detected output current exceeds a second set value which is determined in advance and which has a value lower than the first set value, the output voltage while maintaining the output current at the second set value.

In the above-described configuration, the constant voltage power supply circuit comprises both the output voltage dependent over-current protection circuit unit and the drooping over-current protection circuit unit which uses the external resistor. Therefore, with one constant voltage power supply circuit, there may be used the drooping over-current protection function which strictly controls the limit current value for the over-current with the use of a high-precision external resistor, or the output voltage dependent over-current protection function which does not use the external resistor, depending on the usage.

BRIEF DESCRIPTION OF THE DRAWINGS

The present invention will be further described with reference to the accompanying drawings, wherein like reference numerals refer to like parts in the several views, and wherein.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

One or more embodiments of the present invention will now be described with reference to the drawings. In the following description, a constant voltage power supply circuit having a built-in voltage boosting circuit unit will be described, but alternatively, there may be used a constant voltage power supply circuit which does not have the built-in voltage boosting circuit unit. In addition, as the built-in voltage boosting circuit unit, there will be described a twice voltage boosting circuit of a charge pump type which does not use a capacitive element. Alternatively, the voltage boosting ratio may be other than twice, and the voltage boosting method may be a magnetic energy usage type which uses a reactor, or the like, in place of the charge pump type.

Moreover, a structure of a drooping over-current protection circuit unit and a structure of an output voltage dependent over-current protection circuit unit described below are merely exemplary, and other configurations may be employed so long as the drooping over-current protection circuit unit is a unit which uses an external resistor and the output voltage dependent over-current protection circuit unit is a unit which does not use an external resistor and which uses only built-in elements.

In the following, switching elements are described as n-channel MOS transistors and p-channel MOS transistors. However, the channel types can be changed such as, for example, the n-channel type is changed to the p-channel type and the p-channel type is changed to the n-channel type, by suitably changing a potential relationship in the circuit structure. Alternatively, a spatial field transistor such as a MIS transistor may be used in place of the MOS transistor. Alternatively, the circuit structure may be suitably changed, so that bipolar transistors such as an npn transistor and a pnp transistor may be used in place of the n-channel and p-channel MOS transistors.

In the description below, the same reference numerals are assigned to similar elements among all drawings, and descriptions of the similar elements will not be repeated. In addition, in the description, reference numerals which have been referred to previously will be used as necessary.

Figure 1:
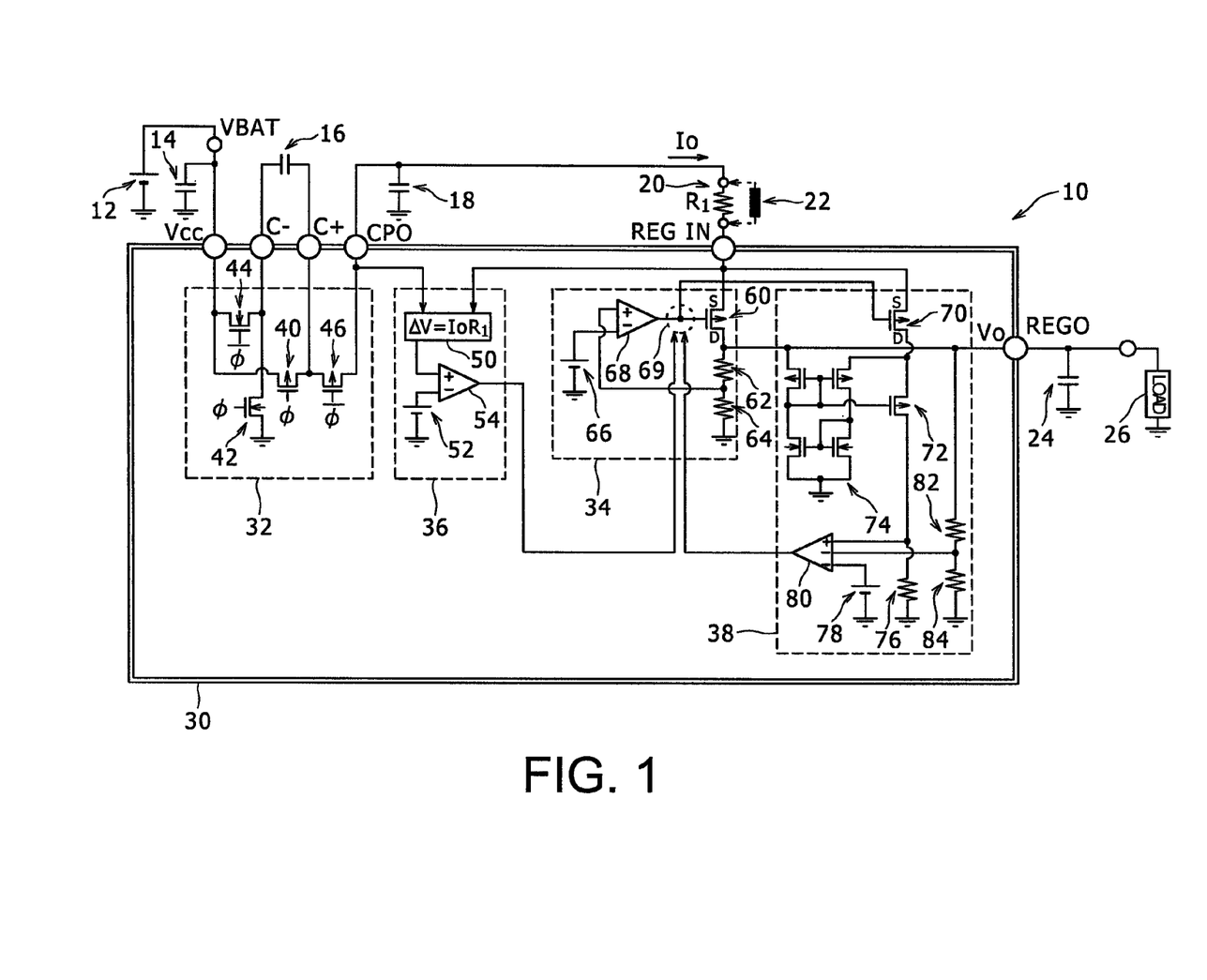
FIG. 1 is a diagram for explaining a structure of a constant voltage power supply circuit according to one or more embodiments of the present invention.

FIG. 1 is a diagram showing a load drive system 10 which supplies electric power to a load 26 using a constant voltage power supply circuit 30. The constant voltage power supply circuit 30 comprises, as terminals, a Vcc terminal, a C− terminal, a C+ terminal, a CPO terminal, a REGIN terminal, and a REGO terminal, and is a semiconductor integrated circuit including a voltage boosting circuit unit 32, a constant voltage circuit unit 34, a drooping over-current protection circuit unit 36, and an output voltage dependent over-current protection circuit unit 38, which are built therein.

An electricity storage device 12 which is connected to the Vcc terminal is a battery which is used as an input power supply in the constant voltage power supply circuit 30, and is, for example, a battery of a few volts used in a portable phone or the like. An input-side capacitor 14 connected between the Vcc terminal and the ground is a capacitive element which smoothens a voltage or a current on a side of the input power supply.

A shift capacitor 16 which is connected using the C− terminal and the C+ terminal is a capacitive element which has a function of temporarily storing charges from the electricity storage device 12 such that charges are stored in a first half of a voltage boosting operation and the charges are moved to a holding capacitor 18 in a second half of the voltage boosting operation in the voltage boosting circuit unit 32.

The holding capacitor 18 connected between the CPO terminal which is an output terminal of the voltage boosting circuit unit 32 and the ground is a capacitive element which receives charges moved from the shift capacitor 16.

An external resistor 20 which is placed in a series connection between the CPO terminal which is the output terminal of the voltage boosting circuit unit 32 and the REGIN terminal which is an input terminal of the constant voltage circuit unit 34 is a resistive element having a highly precise resistance value $R_1$. The external resistor 20 is an element for detecting the magnitude of an output current $I_O$ flowing therein, and the detected output current $I_O$ is used in the drooping over-current protection circuit unit 36. The precision of the external resistor 20 can be selected and set according to the specification of the constant voltage power supply circuit 30. For example, the precision of the resistance value may be set to ranges such as ±5%, ±1%, ±0.1%, or the like. The precision of the resistance value may include voltage characteristics, temperature characteristics, etc.

A short-circuit element 22 which is detachably attached in parallel to the external resistor 20 is a component which has a function of short-circuiting the external resistor 20 in cases such as a specification which does not require the use of the drooping over-current protection circuit unit 36. Specifically, a metal rod, a conductor line, or the like may be used as the short-circuit element 22. In the above-described configuration, the short-circuit element 22 is provided in parallel to the external resistor 20, but alternatively, the short-circuit element 22 may be used in place of the external resistor 20.

The load 26 connected to the REGO terminal operates by supply of a constant voltage electric power from the constant voltage power supply circuit 30, and is, for example, a light-emitting element of a portable phone or the like. An output-side capacitor 24 connected between the REGO terminal and the ground is a capacitive element which smoothens a voltage or a current on a side of the load.

The voltage boosting circuit unit 32 inside the constant voltage power supply circuit 30 is a charge pump type voltage boosting circuit which boosts the voltage of the electricity storage device 12 to a voltage twice the original voltage, using capacitive elements and switching elements. The boosted electric power is output from the CPO terminal and supplied to the constant voltage circuit unit 34 from the REGIN terminal.

The voltage boosting function is realized by four switching elements 40, 42, 44, and 46, and the shift capacitor 16 and the holding capacitor 18, which have already been described. The shift capacitor 16 and the holding capacitor 18 are connected as external components using the C− terminal, the C+ terminal, and the CPO terminal of the constant voltage power supply circuit 30, and, therefore, the voltage boosting circuit unit 32 inside the constant voltage power supply circuit 30 includes the remaining components; that is, the four switching elements 40, 42, 44, and 46.

The switching element 40 is a p-channel transistor which is placed in a series connection between the Vcc terminal and the C+ terminal. The switching element 42 is an n-channel transistor placed and connected between the C− terminal and the ground. The switching element 44 is an n-channel transistor placed in a series connection between the Vcc terminal and the C− terminal. The switching element 46 is a p-channel transistor placed in a series connection between the C+ terminal and the CPO terminal.

Of these four switching elements 40, 42, 44, and 46, the switching elements 40 and 42 are switched ON during a first half period of the voltage boosting operation and are switched OFF during a second half period of the voltage boosting operation. The switching elements 44 and 46 are switched OFF during the first half period of the voltage boosting operation and are switched ON during the second half period of the voltage boosting period. More specifically, there are employed a forward clock which repeats a voltage of H level and a voltage of L level at a predetermined period and an inverted clock which is in an inverted relationship with the forward clock, the switching elements 40 and 42 are switched ON with the voltage of H level of the forward clock and the switching elements 44 and 46 are switched ON with the voltage of H level of the inverted clock. In FIG. 1, the forward clock is represented with φ and the inverted clock is represented with φ-bar, wherein a horizontal line is added above φ.

Figure 2:
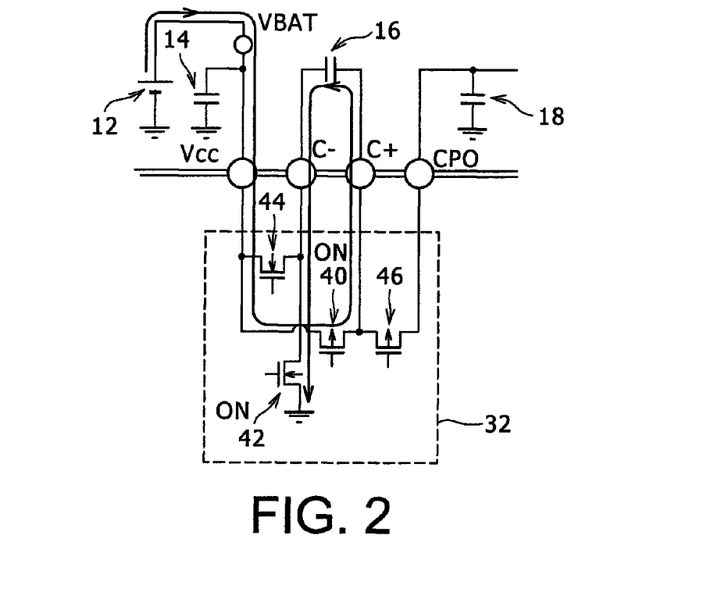
FIG. 2 is a diagram for explaining a first half period of an operation of a voltage boosting circuit unit in a constant voltage power supply circuit according to one or more embodiments of the present invention.
Figure 3:
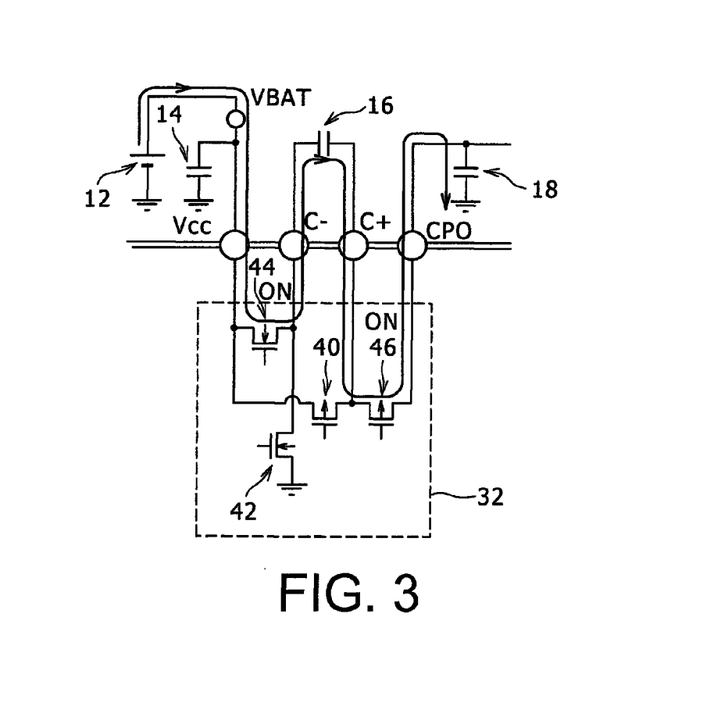
FIG. 3 is a diagram for explaining a second half period of the operation of the voltage boosting circuit unit, continued from FIG. 2.

FIGS. 2 and 3 are diagrams for explaining the voltage boosting operation by the voltage boosting circuit unit 32, the shift capacitor 16, and the holding capacitor 18. FIG. 2 shows the first half period of the voltage boosting operation, and FIG. 3 shows the second half period of the voltage boosting operation.

FIG. 2 shows the first half period of the voltage boosting operation in which the forward clock φ is at the voltage of the H level and the inverted clock φ-bar is at the voltage of the L level. In this case, the switching elements 40 and 42 are switched ON and the switching elements 44 and 46 are switched OFF. Therefore, the current from the electricity storage device 12 enters the voltage boosting circuit unit 32 from the Vcc terminal, flows through the switching element 40 and to the outside from the C+ terminal, charges the shift capacitor 16 from the C+ terminal side to the C− terminal side, again enters the voltage boosting circuit unit 32 from the C− terminal, and flows through the switching element 42 to the ground.

In this manner, in the first half period of the voltage boosting operation, the shift capacitor 16 is charged from the C+ terminal side to the C− terminal side by the electricity storage device 12.

FIG. 3 shows the second half period of the voltage boosting operation which follows the first half period, and in which the forward clock φ is set to the voltage of the L level and the inverted clock φ-bar is set to the voltage of the H level. In this case, the switching elements 40 and 42 are switched OFF and the switching elements 44 and 46 are switched ON. Therefore, the current from the electricity storage device 12 enters the voltage boosting circuit unit 32 from the Vcc terminal, flows through the switching element 44 and to the outside from the C− terminal, flows in the shift capacitor 16 from the C− terminal side to the C+ terminal side, again enters the voltage boosting circuit unit 32 from the C+ terminal, flows through the switching element 46 and to the outside from the CPO terminal, and charges the holding capacitor 18.

In this manner, in the second half period of the voltage boosting operation, the charges charged and accumulated in the shift capacitor 16 from the C+ terminal side to the C− terminal side in the first half period are transferred from the C− terminal side toward the C+ terminal side to the holding capacitor 18. With this process, the voltage of the holding capacitor 18 becomes a voltage in which the inter-terminal voltage of the electricity storage device 12 is boosted to twice the voltage. This is the voltage boosting function by the voltage boosting circuit unit 32, the shift capacitor 16, and the holding capacitor 18. The electric power accumulated in the holding capacitor 18 is supplied from the REGIN terminal to the constant voltage circuit unit 34.

Referring again to FIG. 1, the constant voltage circuit unit 34 is a circuit having a constant voltage setting function with functions to set the voltage of the supplied electric power supplied from the REGIN terminal to a desired constant voltage $V_A$, and to output to the REGO terminal. The constant voltage circuit unit 34 comprises an output control transistor 60 which is a p-channel MOS transistor having a source terminal connected to the REGIN terminal, two resistor elements 62 and 64 which are placed in a series connection between a drain terminal of the output control transistor 60 and the ground, and a constant voltage error amplifier 68 wherein the voltage at a connection point of the two resistor elements 62 and 64 is input at a first side input terminal, and a reference voltage 66 is input to a second side input terminal, and which has an output terminal connected to a control terminal of the output control transistor 60 through an interface unit 69.

The interface unit 69 is an interface circuit for inputting the output of the above-described constant voltage error amplifier 68, an output of a drooping error amplifier 54 of the drooping over-current protection circuit unit 36 to be described below, or an output of an output voltage dependent error amplifier 80 of the output voltage dependent over-current protection circuit unit 38, to the control terminal of the output control transistor according to a predetermined priority or according to a predetermined order such that these outputs do not interfere with each other. As the priority and the order, for example, there may be employed an order in which the outputs are sequentially input from a voltage of the OFF side closest to the current gate voltage of the output control transistor 60.

Figure 4:
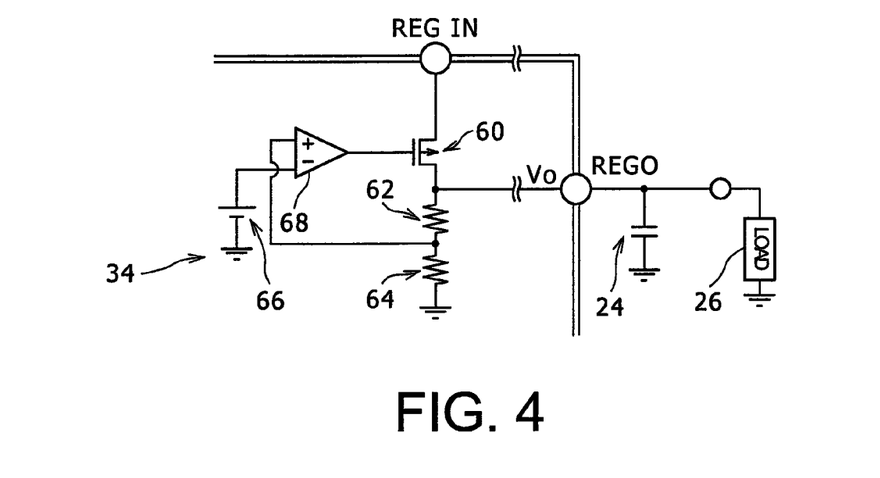
FIG. 4 is a diagram for explaining a structure of a constant voltage circuit unit in a constant voltage power supply circuit according to one or more embodiments of the present invention.

FIG. 4 is a diagram showing basic elements of the constant voltage circuit unit 34 in the constant voltage power supply circuit 30. As shown in FIG. 4, the twice-boosted voltage supplied from the REGIN terminal is compared to the reference voltage 66 by the constant voltage error amplifier 68 so that the output voltage $V_O$ supplied from the REGO terminal to the load 26 is set to the constant voltage $V_A$ which is determined in advance. Here, the error amplifier is a differential amplifier which outputs, when there is a difference between voltages which are input to two input terminals, a signal based on the difference.

Specifically, the output voltage $V_O$ which is the voltage between the drain terminal of the output control transistor 60 and the ground is suitably divided by the two resistor elements 62 and 64, and the divided voltage is input to the first side input terminal of the constant voltage error amplifier 68 and compared to the reference voltage 66 which is input to the second side input terminal. When it is determined as a result of the comparison that there is a difference between the actual output voltage $V_O$ and the predetermined constant voltage $V_A$, the difference is returned as an error feedback value through the interface unit 69 to the gate terminal of the output control transistor 60, which is the control terminal.

For example, when the actual output voltage $V_O$ is higher than the predetermined constant voltage $V_A$, the error feedback value is set to a voltage in a direction to switch the output control transistor 60 OFF. More specifically, because the output control transistor 60 is a p-channel MOS transistor, if the current gate voltage is, for example, +2.0 V, the gate voltage is increased in the positive side to +2.1 V or the like. With this process, the output control transistor 60 operates in an OFF-side, the voltage between the drain and the source (drain-source voltage) is increased, and the output voltage $V_O$ is reduced toward the desired constant voltage $V_A$.

On the other hand, when the actual output voltage $V_O$ is lower than the predetermined constant voltage $V_A$, the error feedback value is set at a voltage in a direction to switch the output control transistor 60 ON. In the above-described example configuration, if the current gate voltage is, for example, +2.0 V, the gate voltage is reduced in the negative side to +1.9 V or the like. With this process, the output control transistor 60 operates in the ON-side, the drain-source voltage is reduced, and the output voltage $V_O$ is increased toward the desired constant voltage $V_A$.

With such a feedback operation, when the actual output voltage $V_O$ is higher than the predetermined constant voltage $V_A$, the actual output voltage $V_O$ is reduced, and, when the actual output voltage $V_O$ is lower than the predetermined constant voltage $V_A$, the actual output voltage $V_O$ is increased, so that the actual output voltage $V_O$ becomes equal to the predetermined constant voltage $V_A$ and stabilized. This is the operation of the constant voltage circuit unit 34.

Referring again to FIG. 1, the drooping over-current protection circuit unit 36 is an over-current protection circuit which is provided between the CPO terminal and the REGIN terminal, and which has functions to detect, with the external resistor 20, the output current $I_O$ flowing in the output control transistor 60, and to reduce, when the detected output current $I_O$ exceeds a drooping limit current value $I_B$ which is a set value which is determined in advance, the output voltage $V_O$ toward zero while maintaining the output current $I_O$ at $I_B$.

Figure 5:
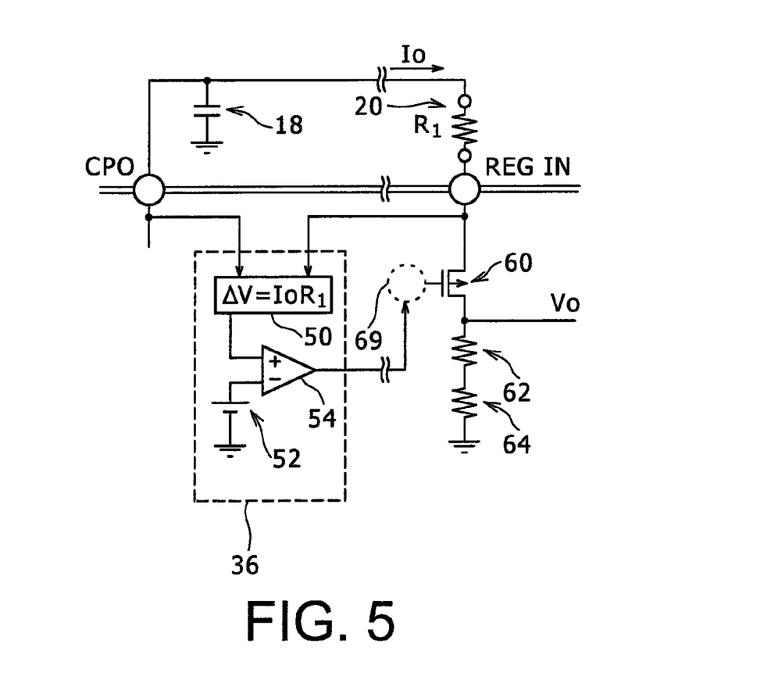
FIG. 5 is a diagram for explaining a structure of a drooping over-current protection circuit unit in a constant voltage power supply circuit according to one or more embodiments of the present invention.

FIG. 5 is a diagram showing elements related to the drooping over-current protection circuit unit 36 in the constant voltage power supply circuit 30. The drooping over-current protection circuit unit 36 comprises a voltage difference detecting unit 50 which detects, as a voltage difference $\Delta V$, a voltage drop caused by the output current $I_O$ flowing through the external resistor 20 of the resistance value $R_1$, and the drooping error amplifier 54 in which the voltage difference $\Delta V$ is input at a first side input terminal and a reference voltage 52 is input to a second side input terminal, and which has an output terminal connected to the control terminal of the output control transistor 60 through the interface unit 69.

The voltage difference $\Delta V$ which is input to the first side input terminal of the drooping error amplifier 54 is compared to the reference voltage 52 which is input to the second side input terminal. The reference voltage 52 is set at a value where the output current $I_O$ corresponds to a drooping limit current value $I_B$ which is determined in advance. When it is determined as a result of the comparison that there is a difference between the reference voltage 52 and the actual voltage difference $\Delta V$, the difference is returned as an error feedback value to the gate terminal which is the control terminal of the output control transistor 60 through the interface unit 69.

When it is determined as a result of the comparison of the reference voltage 52 and the actual voltage difference $\Delta V$ that the actual output current $I_O$ exceeds the drooping limit current value $I_B$, the error feedback value is set at a voltage in a direction to switch the output control transistor 60 OFF. Specifically, if the current gate voltage of the output control transistor 60 is +2.0 V, for example, the gate voltage is increased in the positive side to +2.1 V or the like. With this process, the output control transistor 60 operates on the OFF-side, the drain-source voltage is increased, and the output voltage $V_O$ is gradually reduced.

When, on the other hand, the actual output current $I_O$ is less than or equal to the drooping limit current value $I_B$, the drooping error amplifier 54 does not output the error feedback value. Therefore, in this case, the constant voltage circuit unit 34 executes the constant voltage setting process with the output of the constant voltage error amplifier 68, as in normal circumstances.

Figure 6:
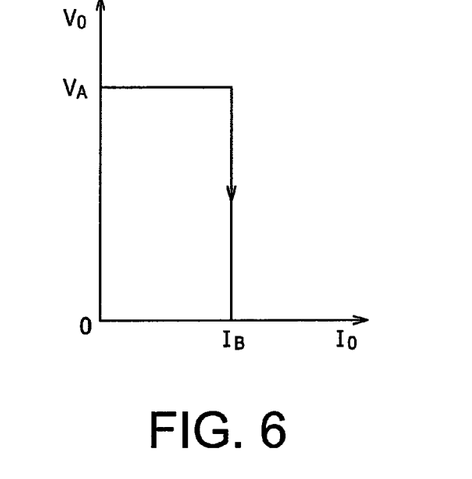
FIG. 6 is a diagram for explaining an operation of the drooping over-current protection circuit unit shown in FIG. 5.

FIG. 6 is a diagram for explaining an operation of the drooping over-current protection circuit unit 36 as a single entity. Because the constant voltage power supply circuit 30 also has the output voltage dependent over-current protection circuit unit 38, even if the external resistor 20 is used, the operation of the output voltage dependent over-current protection circuit unit 38 is superposed to the operation of the drooping over-current protection circuit unit 36. FIG. 6 is a diagram for explaining the operation of the drooping over-current protection circuit unit 36 as a single entity for a hypothetical case where the output voltage dependent over-current protection circuit unit 38 is not provided in the constant voltage power supply circuit 30.

The horizontal axis of FIG. 6 represents the output current $I_O$ and the vertical axis represents the output voltage $V_O$. Because of the operation of the constant voltage circuit unit 34 of the constant voltage power supply circuit 30, the output voltage $V_O$ is maintained at the constant voltage $V_A$ regardless of the magnitude of the output current $I_O$. When the output current $I_O$ exceeds the drooping limit current value $I_B$ which is determined in advance, the output voltage $V_O$ is gradually reduced toward zero while the output current $I_O$ is maintained at the drooping limit current value $I_B$, by the function of the drooping over-current protection circuit unit 36. The circuit is called a "drooping type" because, as shown in FIG. 6, the output voltage $V_O$ is vertically reduced from the constant voltage $V_A$ toward zero while the current value is set constant, in the voltage/current characteristic.

Referring again to FIG. 1, the output voltage dependent over-current protection circuit unit 38 is an over-current protection circuit having a function of reducing, when the output current $I_O$ flowing in the output control transistor 60 exceeds an output voltage dependent limit current value $I_A$ which is determined in advance, the output current $I_O$ from the output voltage dependent limit current value $I_A$, in a manner dependent on the reduction of the output voltage $V_O$.

As the limit current for the over-current protection, there are employed the output voltage dependent limit current value $I_A$ and the drooping limit current value $I_B$ which is already described. In order to distinguish these limit current values, the output voltage dependent limit current value $I_A$ will hereinafter also be referred to as a first set value, and the drooping limit current value $I_B$ will hereinafter also be referred to as a second set value. The drooping limit current value $I_B$ which is the second set value is set at a value lower than the output voltage dependent limit current value $I_A$ which is the first set value.

Figure 7:
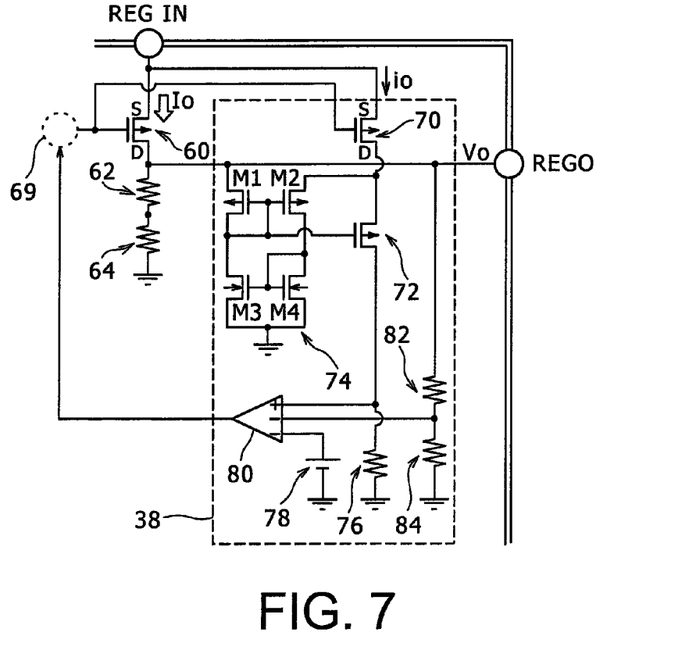
FIG. 7 is a diagram for explaining a structure of an output voltage dependent over-current protection circuit unit in a constant voltage power supply circuit according to one or more embodiments of the present invention.

FIG. 7 is a diagram showing elements related to the output voltage dependent over-current protection circuit unit 38 in the constant voltage power supply circuit 30. The output voltage dependent over-current protection circuit unit 38 comprises a branch transistor 70, a current mirror transistor 72 and a current mirror block circuit 74 which set a drain-source voltage of the branch transistor 70 to a voltage matching the drain-source voltage of the output control transistor 60, and an internal resistor 76, in order to detect the output current $I_O$ flowing in the output control transistor 60 without the use of the external resistor 20. In addition, the output voltage dependent over-current protection circuit unit 38 also comprises the output voltage dependent error amplifier 80 which compares the output current $I_O$ to a reference voltage 78 corresponding to the output voltage dependent limit current value $I_A$ or to the output voltage $V_O$ and outputs a result of the comparison as an error feedback value. Furthermore, the output voltage dependent over-current protection circuit unit 38 comprises two resistor elements 82 and 84 which adjust the output voltage $V_O$ so that the output voltage $V_O$ is suitable as an input value of the output voltage dependent error amplifier 80.

The branch transistor 70 is a p-channel MOS transistor similar to the output control transistor 60, and has a gate terminal connected to the gate terminal of the output control transistor 60 and a source terminal connected to the source terminal of the output control transistor 60. In other words, the branch transistor 70 and the output control transistor 60 are connected to each other in a current mirror relationship.

Therefore, a current $I_O$ flowing in the branch transistor 70 is proportional to the output current $I_O$ flowing in the output control transistor 60, with a proportionality constant determined by a size ratio of the branch transistor 70 and the output control transistor 60. If the branch transistor 70 and the output control transistor 60 are identical in size, the current flowing in the branch transistor 70 is identical to the current flowing in the output control transistor 60. In other words, the original output current $I_O$ which flows in the output control transistor 60 when the branch transistor 70 is not provided flows in both the output control transistor 60 and the branch transistor 70 in a half amount; that is, $I_O/2$. When the sizes of the transistors are set in this manner, the output current supplied to the load 26 is reduced to half of the original output current $I_O$.

In consideration of this, it is desirable to set the current $I_O$ flowing in the branch transistor 70, in order to prevent the output current supplied to the load 26 from being significantly changed from the original output current $I_O$. For example, it is desirable that a current of about a few % of the original output current $I_O$ is set as the current $I_O$ flowing in the branch transistor 70. For example, if the amount is to be set to about 1%, the size of the branch transistor 70 may be set to approximately 1/100 that of the output control transistor 60. With such a configuration, even if the branch transistor 70 is provided, the current flowing in the output control transistor 60 may be set to a value which is approximately the same as the original output current $I_O$. In the following description, the description will be continued with an assumption that the current flowing in the output control transistor 60 when the branch transistor 70 is provided is the original output current $I_O$.

The current mirror transistor 72 and the current mirror block circuit 74 are provided, as described above, in order to match the drain-source voltage of the branch transistor 70 with the drain-source voltage of the output control transistor 60. Unlike the resistor element, the branch transistor 70 does not have a straight line voltage/current characteristic. More specifically, the voltage/current characteristic is such that, as the drain-source voltage is increased, the current I flowing between the drain and the source is gradually saturated. Therefore, in order to improve the precision of estimating the output current $I_O$ based on the current $I_O$, the drain-source voltage of the branch transistor 70 is matched with the drain-source voltage of the output control transistor 60.

The current mirror block circuit 74 comprises transistors M1~M4. The transistors M1 and M2 are p-channel MOS transistors and the transistors M3 and M4 are n-channel MOS transistors. A source of the transistor M1 is connected to the drain of the output control transistor 60, and a gate of the transistor M1 is connected to a gate of the transistor M2 along with a source of the transistor M1. The transistor M1 and M3 are connected in series and the transistors M2 and M4 are connected in series. A source of the transistor M3 and a source of the transistor M4 are connected to each other and grounded. A gate of the transistor M4 is connected to a gate of the transistor M3 along with a drain of the transistor M4.

The current mirror transistor 72 is a p-channel transistor similar to the transistors M1 and M2, and a source of the current mirror transistor 72 is connected to the drain of the branch transistor 70. A gate of the current mirror transistor 72 and the gate of the transistor M2 are connected to each other, and a source of the current mirror transistor 72 is connected to a source of the transistor M2. In this manner, the current mirror transistor 72 and the transistor M2 are connected to each other in a current mirror relationship.

Because the source of the transistor M1 of the current mirror block circuit 74 is connected to the drain of the output control transistor 60, the source of the transistor M2 is connected to the drain of the branch transistor 70, the gate of the transistor M1 and the gate of the transistor M2 are connected to each other, and the transistor M2 and the current mirror transistor 72 are connected to each other in the current mirror relationship as described above, the drain-source voltage of the branch transistor 70 becomes equal to the drain-source voltage of the output control transistor 60.

The internal resistor 76 is a resistive element which is placed in a series connection between the drain of the current mirror transistor 72 and the ground, and detects the magnitude of the branched current $I_O$. As described above, the branched current $I_O$ is a current proportional to the output current $I_O$ flowing in the output control transistor 60. Therefore, a voltage drop in the internal resistor 76 becomes a detection value proportional to the magnitude of the output current $I_O$. The value of the voltage drop in the internal resistor 76 is input to a first side input terminal of the output voltage dependent error amplifier 80.

The two resistor elements 82 and 84 are resistive elements placed in a series connection between the drain of the output control transistor 60 and the ground. A connection point between the two resistor elements 82 and 84 is at a divided voltage value of the output voltage $V_O$ of the output control transistor 60, and the value is input to a second side input terminal of the output voltage dependent error amplifier 80.

In the output voltage dependent error amplifier 80, the reference voltage 78 is also input to the second side input terminal. The reference voltage 78 is set to a value where the output current $I_O$ corresponds to the output voltage dependent limit current value $I_A$ which is determined in advance. Therefore, in the output voltage dependent error amplifier 80, one of the reference values to which the voltage drop at the internal resistor 76 which is a detection value corresponding to the output current $I_O$ is compared is the reference voltage 78 corresponding to the output voltage dependent limit current value $I_A$ and the other reference value is a value corresponding to the output voltage $V_O$ of the output control transistor 60. In the output voltage dependent error amplifier 80, a lower value of these two values is used as the reference value.

Here, the relationship of the two reference values is set such that, when the output voltage $V_O$ is at the constant voltage $V_A$, the reference voltage 78 and the value corresponding to the output voltage $V_O$ of the output control transistor 70 are equal to each other. Therefore, when the output voltage $V_O$ becomes lower than the constant voltage $V_A$, the value corresponding to the output voltage $V_O$ of the output control transistor 60 is used as the reference value to which the voltage drop at the internal resistor 76 is to be compared.

In this manner, a lower value of the two reference values and the voltage drop at the internal resistor 76 are compared to each other. If it is determined as a result of the comparison that there is a difference between the reference value and the voltage drop in the internal resistor 76, the difference is returned as an error feedback value to the gate terminal of the output control transistor 60 which is the control terminal through the interface unit 69.

Figure 8:
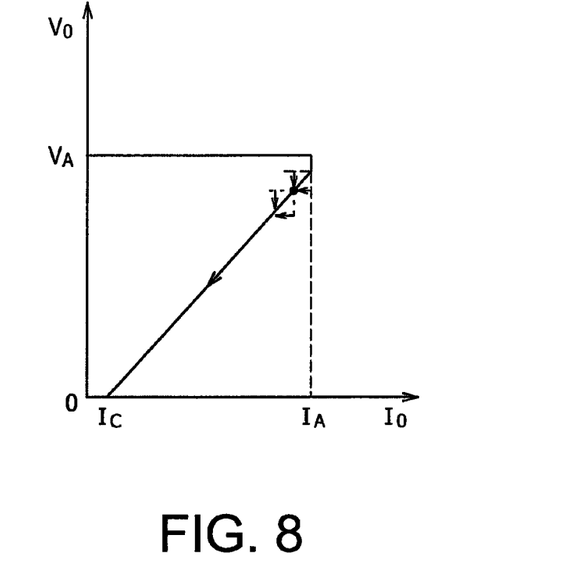
FIG. 8 is a diagram for explaining an operation of the output voltage dependent over-current protection circuit unit shown in FIG. 7.

FIG. 8 is a diagram for explaining an operation of the output voltage dependent over-current protection circuit unit 38 as a single entity. Although the constant voltage power supply circuit 30 also has the drooping over-current protection circuit unit 36, by connecting the short-circuit element 22 in parallel to the external resistor 20 or by attaching the short-circuit element 22 in place of the external resistor 20, it is possible to limit the function of the over-current protection of the constant voltage power supply circuit 30 to the function of the output voltage dependent over-current protection circuit unit 38.

Here, similar to the case of FIG. 6, a horizontal axis and a vertical axis in FIG. 8 represent the output current $I_O$ and the output voltage $V_O$, respectively. In FIG. 8 also, because of the operation of the constant voltage circuit unit 34 of the constant voltage power supply circuit 30, the output voltage $V_O$ is maintained at the constant voltage $V_A$ regardless of the magnitude of the output current $I_O$. When the output current $I_O$ exceeds the output voltage dependent limit current value $I_A$ which is determined in advance, because of the comparison with the reference voltage 78, the output voltage $V_O$ is reduced from the constant voltage $V_A$ while the output current $I_O$ is maintained at the output voltage dependent limit current value $I_A$. When the output voltage $V_O$ is reduced from the constant voltage $V_A$, as described above, the reference value of the output voltage dependent error amplifier 80 is changed from the reference voltage 78 to the value corresponding to the output voltage $V_O$ of the output control transistor 60.

When the reference value of the output voltage dependent error amplifier 80 is reduced due to the reduction of the output voltage $V_O$ in this manner, the output current $I_O$ compared to the reduced reference voltage is determined as excessive. An error feedback value indicating that the output current $I_O$ is excessive is output from the output voltage dependent error amplifier 80. When the output current $I_O$ is determined to be excessive, the error feedback value which is output from the output voltage dependent error amplifier 80 is set to a voltage in a direction to switch the output control transistor 60 OFF. With this process, the output current $I_O$ is reduced, and, consequently, the output voltage $V_O$ is further reduced.

As described, when the output voltage $V_O$ is reduced, the output current $I_O$ is reduced, and the output voltage $V_O$ is further reduced. This process is sequentially repeated, and, as shown in FIG. 8, the output current $I_O$ is reduced from the state of the constant voltage $V_A$ and the output voltage dependent limit current value $I_A$ toward zero with the reduction of the output voltage $V_O$. A value $I_O$ of the output current $I_O$ when the output voltage $V_O$ is zero can be arbitrarily set by adjusting the relationship or the like of the two reference values of the output voltage dependent error amplifier 80. This is the output voltage dependent over-current protection function. In Japan, the output voltage dependence of the over-current protection is called a "fu"-shape, as the reduction of the output current $I_O$ toward zero with the reduction of the output voltage $V_O$ in the voltage/current characteristic is in a shape of Japanese katakana character "fu."

As described above in the description of the operation of the drooping over-current protection circuit unit 36, the constant voltage power supply circuit 30 also has the output voltage dependent over-current protection circuit unit 38. Therefore, even in the state where the external resistor 20 is used, the operation of the output voltage dependent over-current protection circuit unit 38 is superposed to the operation of the drooping over-current protection circuit unit 36.

Figure 9:
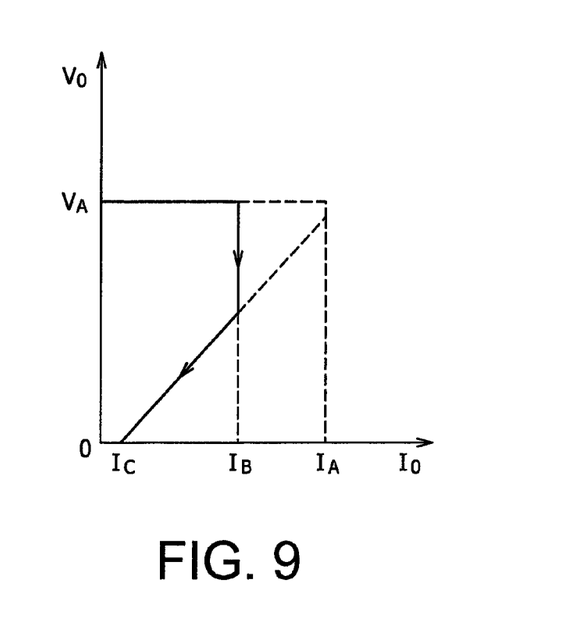
FIG. 9 is a diagram for explaining an operation when a function of a drooping over-current protection circuit unit and a function of an output voltage dependent over-current protection circuit unit are both used in a constant voltage power supply circuit according to one or more embodiments of the present invention.

FIG. 9 is a diagram for explaining this phenomenon. Similar to the cases of FIGS. 6 and 8, a horizontal axis and a vertical axis of FIG. 9 represent the output current $I_O$ and the output voltage $V_O$, respectively.

As described above in relation to the constant voltage circuit unit 34, the output of the constant voltage error amplifier 68, the output of the drooping error amplifier 54, and the output of the output voltage dependent error amplifier 80 are input to the interface unit 69. The outputs are input to the control terminal of the output control transistor 60 according to a priority or an order which is determined in advance such that the outputs do not interfere with each other.

Here, with the operation of the constant voltage circuit unit 34 of the constant voltage power supply circuit 30, the output voltage $V_O$ is maintained at the constant voltage $V_A$ regardless of the magnitude of the output current $I_O$. Because the output voltage dependent limit current value $I_A$ is set higher than the drooping limit current value $I_B$, here, the function of the drooping over-current protection circuit unit 36 is assigned a higher priority, and, when the output current $I_O$ exceeds the drooping limit current value $I_B$ which is determined in advance, the output voltage $V_O$ is gradually reduced toward zero while the output current $I_O$ is maintained at the drooping limit current value $I_B$, by the function of the drooping over-current protection circuit unit 36.

When the output voltage $V_O$ is reduced to a point of crossing the voltage/current characteristic of the output voltage dependent over-current protection circuit unit 38 described above with reference to FIG. 8, the function of the output voltage dependent over-current protection circuit unit 38 is assigned a higher priority from that point on. Specifically, from the point of crossing, the output current $I_O$ is reduced from the drooping limit current value $I_B$ toward zero in a manner dependent on the reduction of the output voltage $V_O$, by the output voltage dependent over-current protection circuit unit 38. In this manner, the constant voltage power supply circuit 30 has a characteristic in which, in the state where the external resistor 20 is used, the operation of the voltage dependent over-current protection circuit unit 38 is superposed to the operation of the drooping over-current protection circuit unit 36. Therefore, with one constant voltage power supply circuit, it is possible to reduce the loss of the output control transistor 60 by the function of the output voltage dependent over-current protection while strictly controlling the limit current value for the over-current with a high-precision external resistor.

The constant voltage power supply circuit of the present invention can be used, with regard to the over-current protection function, both in a usage where strict control of the limit current value as the over-current is desired and in a usage where such strict control of the limit current value is not required.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A constant voltage power supply circuit comprising:
   an output voltage dependent over-current protection circuit unit,
   wherein the output voltage dependent over-current protection circuit unit reduces, when an output current which is output from an output terminal of an output control transistor exceeds a first set value which is determined in advance, the output current from the first set value in a manner dependent on a reduction of an output voltage which is output from the output terminal; and a drooping over-current protection circuit unit, wherein the drooping over-current protection circuit unit detects, with an external resistor, the output current which is output from the output terminal of the output control transistor, and wherein the drooping over-current protection circuit unit reduces, when the detected output current exceeds a second set value which is determined in advance and which has a lower value than the first set value, the output voltage while maintaining the output current at the second set value.

2. The constant voltage power supply circuit according to claim 1, further comprising:

an over-current protection function selecting unit, wherein the over-current protection function selecting unit, when the external resistor is short-circuited, causes only the output voltage dependent over-current protection circuit unit to function, and wherein the over-current protection function selecting unit, when the external resistor is not short-circuited, reduces the output voltage while maintaining the output current at the second set value with a function of the drooping over-current protection circuit unit, and reduces the output current from the second set value in a manner dependent on the reduction of the output voltage, by the output voltage dependent over-current protection circuit unit in a range of output voltage lower than or equal to an output voltage crossing a voltage/current characteristic of the output voltage dependent over-current protection circuit unit.

3. The constant voltage power supply circuit according to claim 2, wherein the output voltage dependent over-current protection circuit unit comprises:

an internal resistor for detecting a magnitude of the output current, and an error amplifier comprising a first side input terminal and a second side input terminal, wherein a value based on a voltage drop at the internal resistor is input to the first side input terminal, and a value based on the output voltage is input to the second side input terminal, and wherein the error amplifier returns a value based on a difference between an input value of the first side input terminal and an input value of the second side input terminal to a control terminal of the output control transistor as an error feedback value.

4. The constant voltage power supply circuit according to claim 3, wherein the constant voltage power supply circuit is structured as a semiconductor integrated circuit.

* * * * *